United States Patent [19]

Riese

[11] Patent Number: 4,836,152
[45] Date of Patent: Jun. 6, 1989

[54] EXHAUST HEATED CRANKCASE FOR 2-CYCLE MARINE ENGINE

[75] Inventor: Stephen B. Riese, Fond du Lac, Wis.

[73] Assignee: Brunswick Corporation, Skokie, Ill.

[21] Appl. No.: 158,212

[22] Filed: Feb. 19, 1988

[51] Int. Cl.$^4$ ............................................ F02B 75/02
[52] U.S. Cl. ........................... 123/65 EM; 123/73 SC; 60/272; 440/900
[58] Field of Search ....... 123/65 EM, 65 PE, 73 AD, 123/73 SC, 548, 195 HC, 196 W; 60/302, 272; 440/89, 900

[56] References Cited

U.S. PATENT DOCUMENTS

| | | |
|---|---|---|
| 3,310,022 | 3/1967 | Kollman . |
| 3,772,887 | 11/1973 | Ziegler ................................. 440/900 |
| 3,800,753 | 4/1974 | Sullivan et al. .................... 123/73 R |
| 3,805,751 | 4/1974 | Resnick et al. ..................... 123/73 R |
| 3,967,446 | 7/1976 | Harralson et al. ..................... 60/312 |
| 4,082,068 | 4/1978 | Hale .................................. 123/41.02 |
| 4,534,333 | 8/1985 | Slattery ............................... 123/545 |
| 4,590,897 | 5/1986 | Hundertmark ..................... 123/73 A |
| 4,668,199 | 5/1987 | Freund et al. ......................... 440/89 |
| 4,735,046 | 4/1988 | Iwai ...................................... 60/302 |

Primary Examiner—David A. Okonsky
Attorney, Agent, or Firm—Andrus, Sceales, Starke & Sawall

[57] ABSTRACT

The idle exhaust pressure relief system in an outboard motor is utilized to simultaneously heat the engine crankcase or other parts of the fuel supply system to prevent the puddling of fuel typically occurring at lower engine temperatures. Because the idle exhaust pressure relief system is inherently operable to conduct hot exhaust gases out of the exhaust manifold only at idle or low speed operation, heat is supplied to the crankcase only at temperatures when fuel puddling typically occurs.

13 Claims, 2 Drawing Sheets

EXHAUST HEATED CRANKCASE FOR 2-CYCLE MARINE ENGINE

BACKGROUND OF THE INVENTION

The present invention relates to an apparatus and method for improving the low speed performance of 2-cycle marine engines and, more particularly, to an apparatus and method for utilizing engine exhaust to heat the engince crankcase in an outboard motor to promote the evaporation of fuel puddles occurring therein.

2-cycle marine engines, commonly used for outboard motors, utilize the crankcase as part of the fuel supply system. A fuel-air mixture passes through a pressurized crankcase system in route to the inlet manifold and engine combustion chamber. The heavier fraction of the fuel, comprising a gasoline and oil mixture, tends to condense inside the crankcase and collect in low lying areas of the crankcase. This phenomenon is known as "puddling" and causes erratic idle and low speed operation and, when the engine is accelerated from idle, the oil-rich puddles pass through the engine resulting in undesirable smoking and poorer acceleration of the engine. Fuel puddling may also occur in other parts of the eninge fuel supply systems, such as the inlet manifold.

Another characteristic of 2-cycle outboard motors is the need to provide exhaust pressure relief at idle or low speed operation. The exhaust system in an outboard motor typically channels the engine exhaust from the exhaust manifold downwardly through the driveshaft housing and out an exhaust outlet in the propeller hub below the water level. When the engine is idling or running at very low speed, however, the exhaust passages in the driveshaft housing fill with water and block the escape of the exhaust. The resulting back pressure adversely affects engine operation, unless some form of relief is provided. In general, pressure relief is provided which allows the exhaust gases to escape upwardly through the higher internal water level in the drive shaft housing and out through an external exhaust opening in the upper portion of the driveshaft housing above the water line. U.S. Pat. Nos. 3,310,022 and 3,967,446 disclose idle exhaust pressure relief systems of this type.

Alternately, an idle relief passage may interconnect the exhaust manifold directly with the open area in the upper portion of the driveshaft housing from which it is exhausted directly to the outside through a similar opening in the housing above the water line. This type of idle exhaust pressure relief system is shown in U.S. Pat. No. 4,668,199.

The auxiliary idle exhaust or idle relief system is intended only to accommodate a relatively low volume of exhaust gas flow at idle or low engine speed. At high speeds exhaust back pressure problems are eliminated and the idle relief system not operative. It is also known to provide an idle relief system with a relatively tortuous path and/or a baffle system within the upper portion of the driveshaft housing to attenuate and muffle the exhaust noise.

Various methods and apparatus are known in the art to eliminate fuel puddling or the adverse affects thereof. A simple early solution involved draining the puddles from the low lying areas within the crankcase directly to the outside. However, potential environmental concerns have lead to other solutions of the problem. U.S. Pat. Nos. 3,800,753, 3,805,751 and 4,590,897 describe apparatus for collecting puddled fuel in the crankcase and recycling it within the engine for eventual combustion. U.S. Pat. No. 4,534,333 describes an idle speed air-fuel passage which is heated by directing the passage through the engine exhaust chest or manifold to heat the air-fuel mixture before entry into the crankcase and combustion chamber. U.S. Pat. No. 4,082,068 discloses the thermostatic control of engine cooling water to maintain a high engine temperature at idle to help prevent condensation and puddling of fuel in the crankcase. However, maintaining a higher engine block temperature only indirectly raises the temperature of the engine crankcase.

It is also known to utilize engine heat to heat the inlet manifold in 4-cycle automotive engines. However, the absence of oil in the fuel and construction of the fuel supply system obviates fuel puddling in 4-cycle engines.

It has been found that, elevated engine temperature are desirable because the higher temperature minimizes condensation of the heavier fuel-oil fractions. However, fuel puddling is not a problem at high engine speed and, in addition, lower engine temperatures result in better and more efficient high speed operation. Thus, the various prior art means for eliminating puddling described above, in addition to requiring the use of supplemental apparatus on the engine, are only needed during the limited periods of idle or low speed operation and are not needed for nor conducive to efficient operation at higher speeds.

SUMMARY OF THE INVENTION

The present invention provides an apparatus and method for utilizing the idle relief system in a 2-cycle marine outboard motor to simultaneously enhance the evaporation of condensed fuel and fuel puddles in the crankcase and other parts of the engine fuel supply system. The auxiliary idle relief passage extending from the main exhaust discharge manifold or passage is positioned to extend adjacent to and into effective heat exchanging contact with the crankcase. The heat from the hot exhaust gases passing through the auxiliary exhaust passage is transferred to and heats the crankcase to enhance the evaporation of fuel fumes and puddles therein. The auxiliary exhaust passage or, as may be convenient, passages may be disposed to provide preferential heating at low lying areas of the crankcase where puddling typically occurs.

Since the need for idle pressure relief in a 2-cycle outboard it utilized at idle or low speed when fuel puddling is also most prevalent, idle relief exhaust gas heating of the crankcase automatically provides evaporation heat transfer precisely during the period of engine operation when it is needed. Because the idle relief typically functions automatically without separate controls, the crankcase heating is likewise provided automatically.

DETAILED DESCRIPTION OF THE PREFERRED EMBODIMENT

Figure 1:
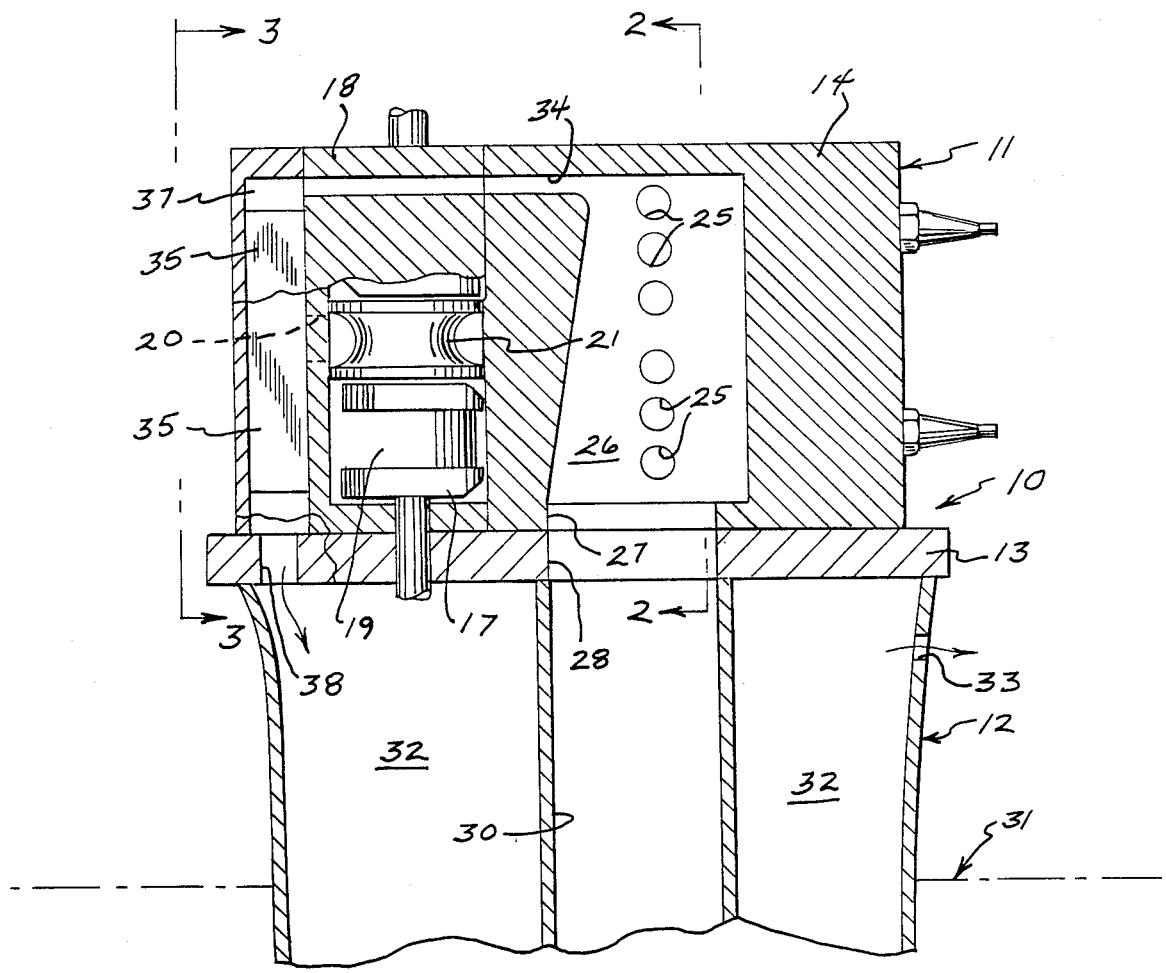
FIG. 1 is a vertical section through the upper portion of an outboard motor showing the apparatus of the present invention for heating the engine crankcase.
Figure 2:
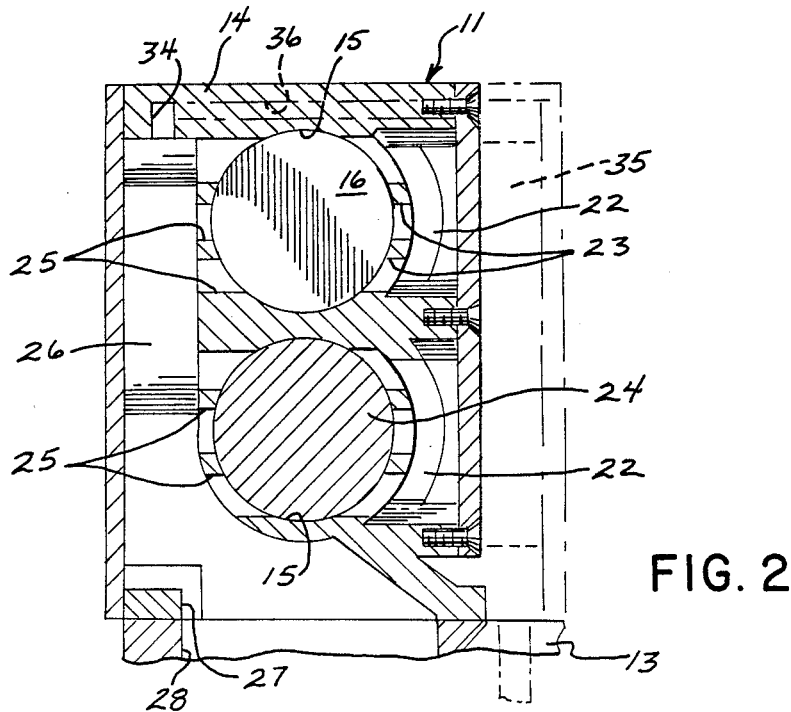
FIG. 2 is a vertical section taken on line 2—2 of FIG. 1.
Figure 3:
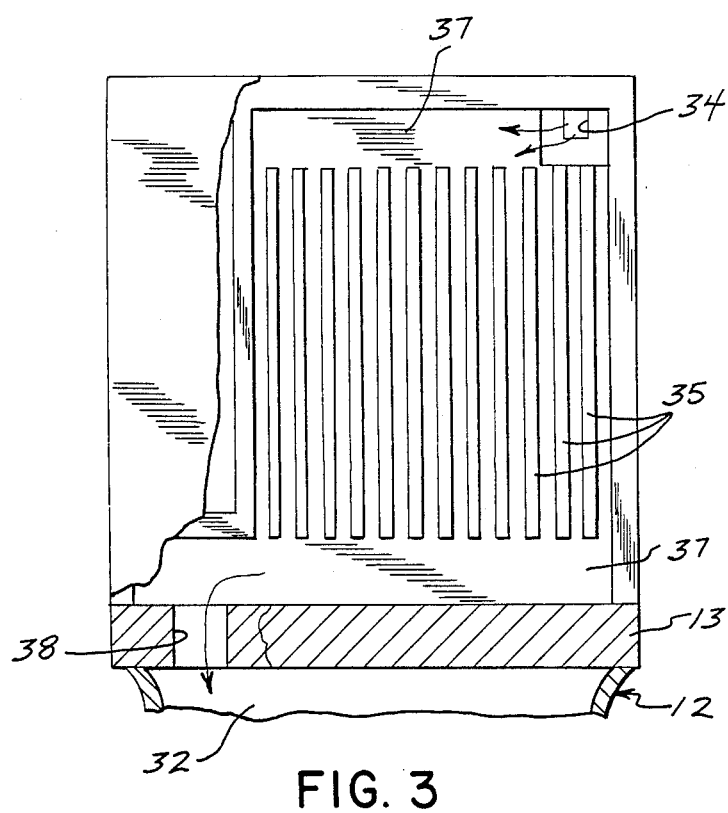
FIG. 3 is an end elevation, party in section taken on line 3—3 of FIG. 1.

In the drawing, an outboard motor 10 includes a 2-cycle engine 11 mounted on a downwardly extending driveshaft housing 12. The connection between the engine and the driveshaft housing includes an adapter plate 13 or plates, as is well known in the art. The engine includes a cylinder block 14 defining cylinders 15 each of which contains a conventional reciprocating piston 16 attached in a conventional manner to a crankshaft 17. The crankshaft 17 is disposed within a crankcase 18 attached to the cylinder block 14.

An air-fuel mixture is provided in a conventional manner by a carburetor (not shown) via a fuel inlet 20 in the crankcase wall. An inlet valve mechanism 21 provides an air-fuel charge to each chamber 19 of the crankcase from which it passes into the cylinder block 14 via an inlet manifold 22 and inlet ports 23 into a combustion chamber 24 within the cylinder 15 between the piston 16 and the head end of the cylinder block 14.

The combined fuel is discharged through exhaust port 25 in the cylinder walls opposite the inlet ports 23. The exhaust from both cylinders is discharged into a common exhaust manifold 26 from which it is discharged into the driveshaft housing 12. Exhaust gases exhit the exhaust manifold through an exhaust manifold outlet 27, an exhaust opening 28 in the adapter plate 13, and into a primary exhaust discharge passage 30 inside the driveshaft housing 12. The primary exhaust discharge passage 30 typically extends downwardly to a propeller unit (not shown) at the lower end of the drive housing where it exits through a passage in the propeller hub below the outside water level 31.

As is well known in-the art, operation of the engine at idle or low speed reduces the exhaust gas pressure and allows outside water to enter and rise in the primary exhaust discharge passage 30 within the drive housing 12. With the escape of exhaust blocked, exhaust pressure builds up in the upper part of the discharge passage 30 and the exhaust manifold 26. The increased exhaust pressure must be relieved in order to prevent poor engine performance and stalling. In one typical prior art idle exhaust pressure relief system, a small passage or passages are provided between the exhaust manifold 26 or the upper portion of the exhaust discharge passage 30 and the open interior 32 in the driveshaft housing 12. The exhaust gases accumulating in the open interior 32 are vented to atmosphere above the outside water level 31 through an idle exhaust port 33 in the wall of the driveshaft housing 12. The idle relief passages (not shown) are of limited size, e.g., $\frac{1}{4}$ to $\frac{1}{2}$ inch in diameter, and cannot accommodate all engine exhaust at higher speeds. Thus, the idle relief passages are only operative at idle or low speed to vent a relatively low volume of exhaust gases.

In accordance with the present invention, the idle exhaust gas relief passage, in the form of an auxiliary exhaust passage 34 is also used to heat portions of the fuel supply system, such as a crankcase 18 and/or the fuel inlet manifold 22. The auxiliary exhaust passage 34 extends from the exhaust manifold 26 and is positioned to lie closely adjacent to the portion or portions of the fuel supply system to be heated. As shown in the drawing, the auxiliary exhaust passage 34 extends through the cylinder block 14 and the crankcase housing 18. The exhaust passage 34 opens into a heating chamber 37 on the outside of the crankcase housing. The heating chamber 37 includes a series of spaced vertically disposed heat exchanging plates or fins 35 past which the exhaust gases flow to an outlet 38 in the lower part of chamber 37. The auxiliary exhaust gases exit the crankcase 18 through the adapter plate 13 and into the open interior 32 of the driveshaft housing 12. At idle or low speed when the rising water level in the primary exhaust discharge passage 30 prevents exhaust discharge, exhaust will pass from the exhaust manifold 26 into the auxiliary exhaust passage 34, into and through the heating chamber 37, into the open interior 32 in the driveshaft housing, and ultimately out through the idle exhaust port 33. A substantial amount of the heat in the hot exhaust gases will be conducted via the heat exchanging fins 35 in the chamber 37 to the crankcase 18.

In addition to or in lieu of the auxiliary exhaust passage 34 and crankcase heating chamber 37, an alternate auxiliary exhaust passage 36 may be positioned to extend along the side and lie in heat exchanging contact with the inlet manifolds 22. In a manner similar to the auxiliary exhaust passage 34, the passage 36 may also extend through the adapter plate 13 and into the open interior of the drive housing.

Engine exhaust gases typically range in temperature from about 400° to 500° F. at idle. With an efficient heat exchanging surface, exhaust gases may be used to heat the crankcase or portions thereof to elevated temperatures to promote the evaporation of fuel puddles. Because fuel puddles tend to accumulate by gravity in low lying areas of the crankcase chambers 19, it may be particularly useful to concentrate the heat exchanging surfaces or fins 35 to provide preferential heating in these areas. More significantly, however, by incorporating crankcase heating into the idle exhaust pressure relief system, heat is provided only when it is needed at idle or low speed. When lower engine tempertures are desirable at higher engine speeds, the exhaust pressure relief system and integral crankcase heating systems are inoperative.

Various modes of carrying out the invention are contemplated as being within the scope of the following claims particularly pointing out and distinctly claiming the subject matter which is regarded as the invention.

I claim:

1. In an outboard boat motor having a two-cycle internal combustion engine and a driveshaft housing attached to and extending downwardly from the engine, an engine exhaust housing adjacent to the combustion chamber, said exhaust housing having a primary exhaust discharge passage extending into the driveshaft housing for discharge below the outside water level and an auxiliary exhaust passage extending into the driveshaft housing for discharge to atmosphere, and system for supplying fuel to the combustion chamber including an engine crankcase and fuel inlet manifold, improved apparatus for eliminating fuel puddling in the fuel supply system comprising an integral extension of the auxiliary exhaust passage, said extension positioned to lie adjacent to and in heat exchanging contact with the fuel supply system.

2. The apparatus as set forth in claim 1 wherein the auxiliary exhaust passage extension is positioned to lie directly adjacent to the engine crankcase.

3. The apparatus as set forth in claim 2 wherein exhaust discharge through the auxiliary exhaust passage is operative at idle or low engine speed.

4. In a two-cycle internal combustion marine propulsion engine including an exhaust housing adjacent to the combustion chamber, said exhaust housing having a main exhaust discharge passage, an engine crankcase including means for supplying fuel to the combustion chamber, an improved apparatus for enhancing the evaporation of fuel puddles in the crankcase comprising an auxiliary exhaust passage in communication with the main exhaust discharge passage, said auxiliary exhaust passage extending adjacent to and in effective heat exchanging contact with the crankcase, whereby heat from the exhaust passing through the auxiliary exhaust passage in transferred to the crankcase.

5. The apparatus as set forth in claim 4 including a driveshaft operatively attached to the engine, a driveshaft housing surrounding the driveshaft, and an exhaust relief port in the driveshaft housing venting to atmosphere, and wherein the auxiliary exhaust passage extends from adjacent to the crankcase into the driveshaft housing.

6. The apparatus as set forth in claim 5 wherein the auxiliary exhaust passage is operative to relieve exhaust back pressure in the main exhaust discharge passage.

7. The apparatus as set forth in claim 6 wherein the auxiliary exhaust passage is operative in response to engine speed.

8. The apparatus as set forth in claim 7 wherein the auxiliary exhaust passage is operative at idle or low engine speed.

9. In a two-cycle internal combustion marine propulsion engine including an exhaust housing adjacent to the combustion chamber, said exhaust housing having a main exhaust discharge passage, an engine crankcase including means for supplying fuel to the combustion chamber, a method for promoting the evaporation of fuel puddles in the crankcase comprising the steps of:

a. providing an auxiliary exhaust passage in communication with the main engine exhaust passage;
b. positioning the auxiliary exhaust passage directly adjacent and in heat exchanging contact with the crankcase; and,
c. directing a flow of engine exhaust gases through the auxiliary exhaust passage.

10. The method as set forth in claim 9 wherein the step of directing a flow of exhaust gases through the auxiliary exhaust passage is responsive to engine speed.

11. The method as set forth in claim 10 wherein the step of directing a flow of exhaust gases is operative at idle or low engine speed.

12. In a two-cycle internal combustion marine propulsion engine of the type having primary engine exhaust passage means extending from the engine exhaust manifold into the driveshaft housing for discharge therefrom below the outside water level, means for relieving engine exhaust back pressure in the primary engine exhaust passage at idle or low speed operation including auxiliary exhaust passage means connecting the engine exhaust manifold and the driveshaft housing for discharge therefrom above the outside water level, and an engine crankcase including means for supplying fuel to the engine, an improved apparatus for promoting the evaporation of fuel accumulating in the crankcase comprising an integral extension of the auxiliary exhaust passage means between its connection with the engine exhaust manifold and the driveshaft housing, said extension lying adjacent to and in heat exchanging contact with the crankcase.

13. The apparatus as set forth in claim 12 including heat exchanging fins integrally attached to and providing contact between the extension and the crankcase.

* * * * *